(12) United States Patent  (10) Patent No.: US 8,397,397 B1
Long et al.  (45) Date of Patent: Mar. 19, 2013

(54) PEDAL MEASUREMENT DEVICE

(75) Inventors: Jeffery E. Long, Canton, MI (US);
Preston Scott Reynolds, Farmington Hills, MI (US); Jerry W. Burke, Macomb, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 45 days.

(21) Appl. No.: 13/220,148

(22) Filed: Aug. 29, 2011

(51) Int. Cl.
*G01D 21/00* (2006.01)

(52) U.S. Cl. ............................................. 33/600; 33/609

(58) Field of Classification Search .................... 33/600, 33/609, 613, 480–485, 474, 475, 478, 498–500, 33/452, 455, 456
See application file for complete search history.

(56) References Cited

U.S. PATENT DOCUMENTS

| | | | | |
|---|---|---|---|---|
| 3,921,302 | A * | 11/1975 | Wilkerson | 33/609 |
| 4,228,592 | A * | 10/1980 | Badger | 33/562 |
| 4,380,872 | A * | 4/1983 | Moran | 33/529 |
| 7,073,267 | B2 * | 7/2006 | Butler et al. | 33/203 |
| 7,343,688 | B2 * | 3/2008 | Price | 33/452 |
| 2008/0189971 | A1 * | 8/2008 | Wo | 33/784 |

FOREIGN PATENT DOCUMENTS

EP  1375873 B1  12/2007

* cited by examiner

*Primary Examiner* — Yaritza Guadalupe-McCall
(74) *Attorney, Agent, or Firm* — Frederick A. Krieger

(57) ABSTRACT

A measurement device for a vehicle having a first pedal and a second pedal is provided and may include a fixture releasably attached to one of the first pedal and the second pedal. A first bar may be supported by the fixture and may extend toward the other of the first pedal and the second pedal and a housing may be slidably attached to the first bar. A second bar may be slidably attached to the housing may include a first surface that engages a first portion of the other of the first pedal and the second pedal and a second surface that engages a second portion of the other of the first pedal and the second pedal. The housing may identify the relative position of the first pedal and the second pedal once in contact with the first portion and the second portion.

20 Claims, 5 Drawing Sheets

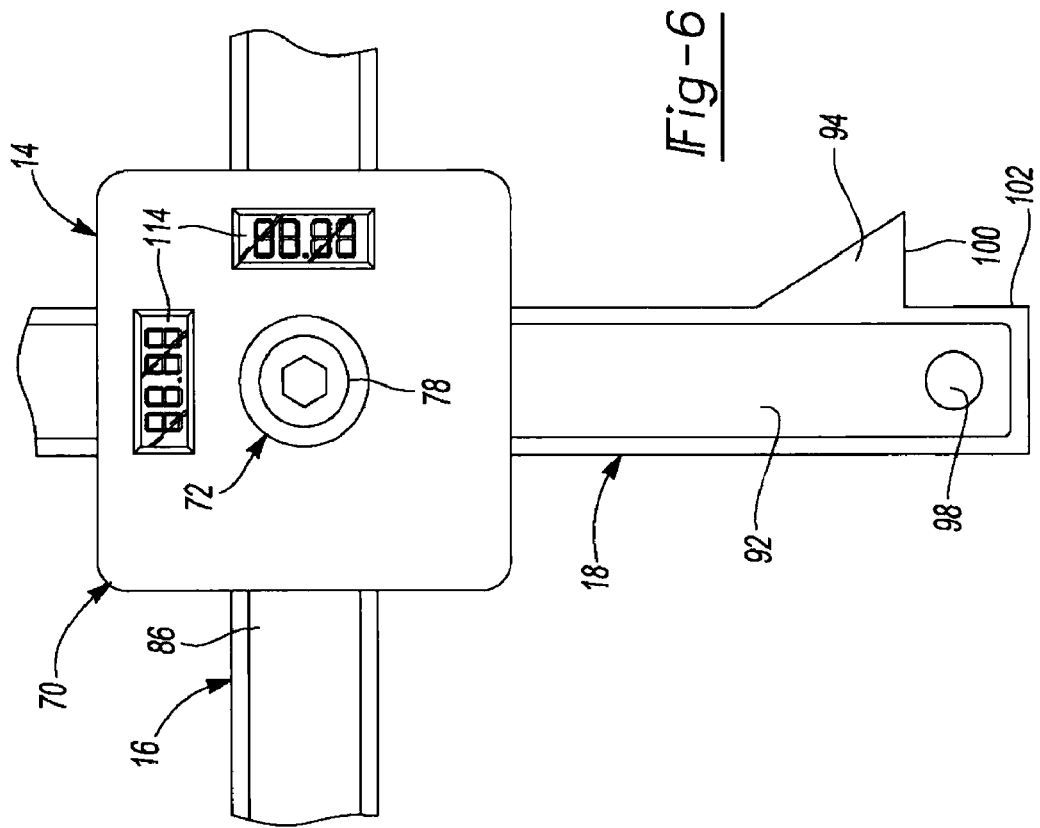
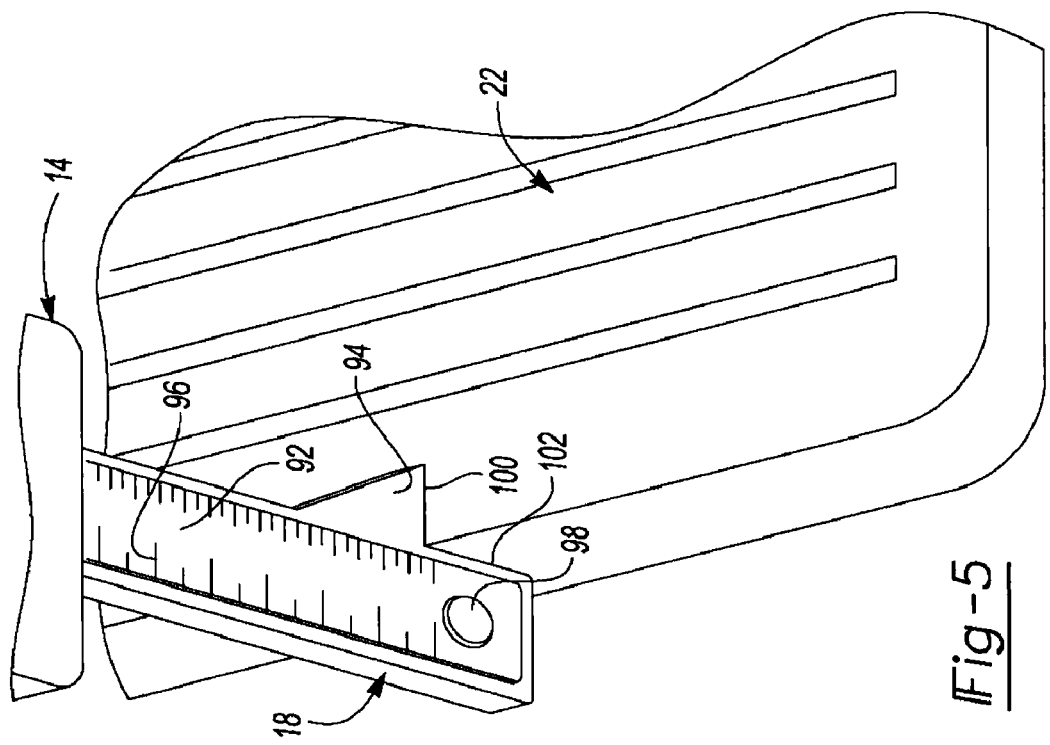

PEDAL MEASUREMENT DEVICE

FIELD

The present disclosure relates to a measurement device and more particularly to a measurement device for use in determining the relative position of vehicle pedals.

BACKGROUND

Modern vehicles typically include at least two pedals for controlling operation of the vehicle. Namely, most vehicles include an accelerator pedal that allows a user to control a speed of the vehicle and a brake pedal that allows the user to apply the brakes of the vehicle, thereby slowing down and/or stopping the vehicle. Vehicles may also include a clutch pedal if the vehicle is equipped with a manual transmission to allow a user to properly shift the manual transmission by engaging and disengaging a clutch of the vehicle through actuation of the clutch pedal.

When designing a vehicle, manufacturers typically position the accelerator pedal relative to the brake pedal to permit independent operation of each pedal and to allow a user to quickly move between use of the accelerator pedal and the brake pedal. If, for example, the vehicle is equipped with a manual transmission, the clutch pedal is similarly located relative to the brake pedal to provide the user with adequate space between the clutch pedal and the brake pedal to operate the clutch pedal and the brake pedal independently from one another and to permit the user to move between use of each pedal.

Generally, two or more pedals are positioned relative to each other in a number of directions for desirable operation of the pedals. For example, pedals are positioned in a cross-car, lateral, direction (also known as a step-over direction) so that the pedals are not spaced too close together and not spaced too far apart, laterally, for desirable pedal operation. The pedals can also be positioned in a lift-off direction where an operator contact surface of one pedal has a desirable offset in an elevation (lift-off) direction relative to an operator contact surface of another pedal. The pedal operator contact surface is, for example, a pedal surface the vehicle operator places a foot against to operate the pedal. Having one pedal contact surface positioned substantially at predetermined elevation relative to another pedal contact surface may desirable for pedal operation and/or operator comfort goals.

While vehicle manufacturers typically do not struggle with identifying the proper relative positions between the various pedals, accurately and repeatedly measuring the cross-car distance and the lift-off distance of the various pedals is often challenging. Conventional scales such as rulers and the like may be used to measure the relative position of the various pedals in the cross-car direction and the lift-off direction. However, such measurement devices do not provide reliable and repeatable results and therefore do not provide reliable information when applied amongst different vehicles.

SUMMARY

A measurement device for a vehicle having a first pedal and a second pedal is provided and may include a fixture releasably attached to one of the first pedal and the second pedal. A first bar may be supported by the fixture and may extend toward the other of the first pedal and the second pedal and a housing may be slidably attached to the first bar. A second bar may be slidably attached to the housing may include a first surface that engages a first portion of the other of the first pedal and the second pedal and a second surface that engages a second portion of the other of the first pedal and the second pedal. The housing may identify the relative position of the first pedal and the second pedal once the first surface is in contact with the first portion and the second surface is in contact with the second portion.

A method is provided and may include attaching a fixture to a first pedal and moving a measurement device along a first bar toward a second pedal until a second bar contacts a first surface of the second pedal. The method may further include moving the second bar relative to the measurement device until the second bar contacts a second surface of the second pedal and identifying a first dimension based on a position of the measurement device relative to the first bar. The method may further include identifying a second dimension based on a position of the measurement device relative to the second bar.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

BRIEF DESCRIPTION OF THE DRAWINGS

FIG. 5 is a partial perspective view showing a portion of the measurement device of FIG. 1 contacting the accelerator pedal of FIG. 4; and FIG. 6 is a partial front view of the measurement device of FIG. 1 showing a housing having a pair of displays.

DETAILED DESCRIPTION

Figure 4:
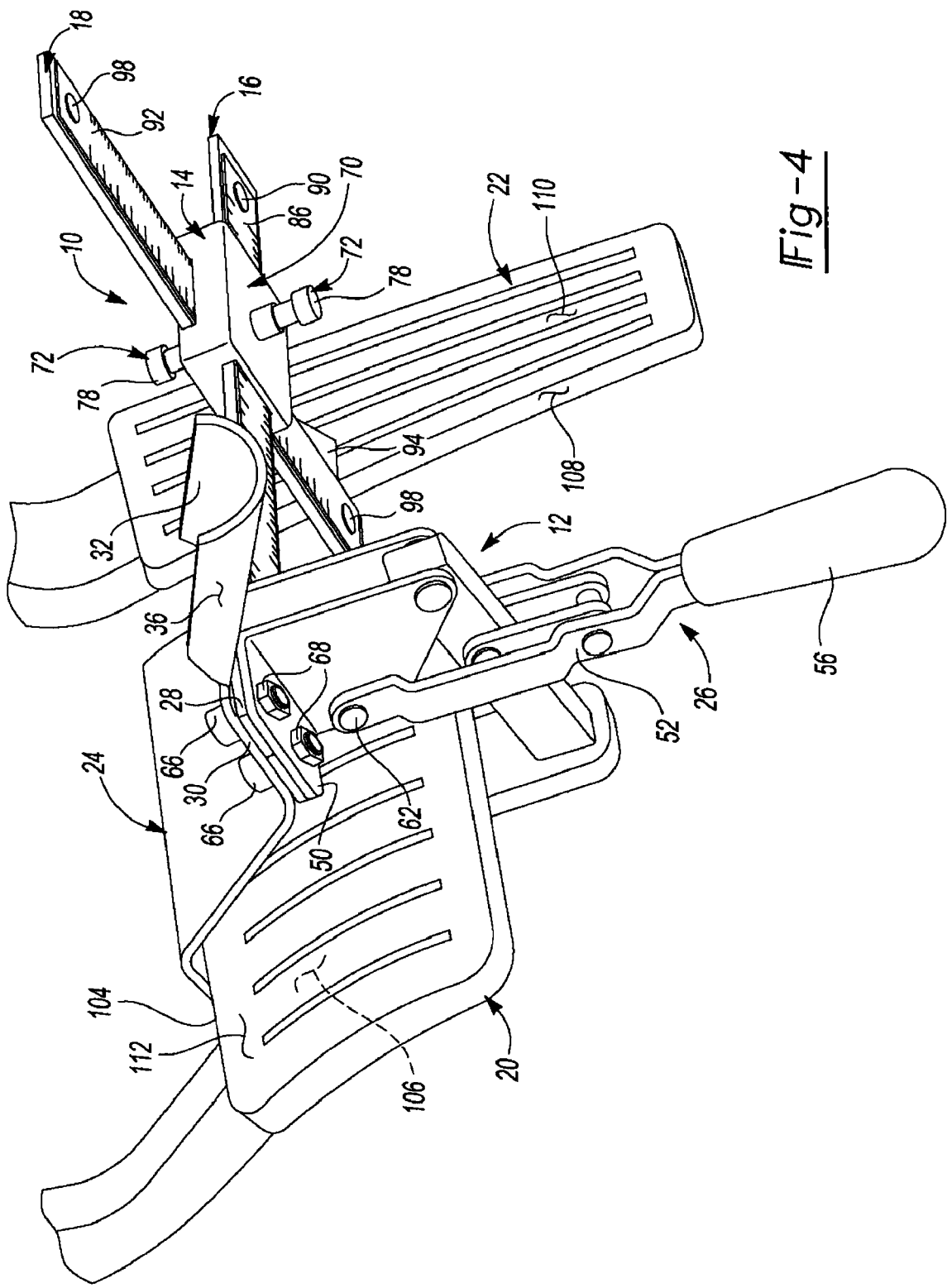
FIG. 4 is a perspective view of the measurement device shown in conjunction with a brake pedal and an accelerator pedal.

With reference to the figures, a measurement device 10 is provided and may include a fixture 12, a housing or junction block 14, a first bar 16, and a second bar 18. The fixture 12 may support the junction block 14, first bar 16, and second bar 18 to permit relative motion between the junction block 14 and the first bar 16 and between the junction block 14 and the second bar 18. Such relative movement between the junction block 14 and the first bar 16 and between the junction block 14 and the second bar 18 allows the junction block 14 to be positioned relative to the fixture 12 in an effort to determine the relative position between a brake pedal 20 and accelerator pedal 22 (FIG. 4). While the measurement device 10 will be described hereinafter and shown in the drawings as being associated with a brake pedal 20 and an accelerator pedal 22, the measurement device could be used to determine the relative position between any pair of pedals. For example, the measurement device 10 could be used to determine the relative position between a clutch pedal (not shown) and the brake pedal 20, for example.

Figure 1:
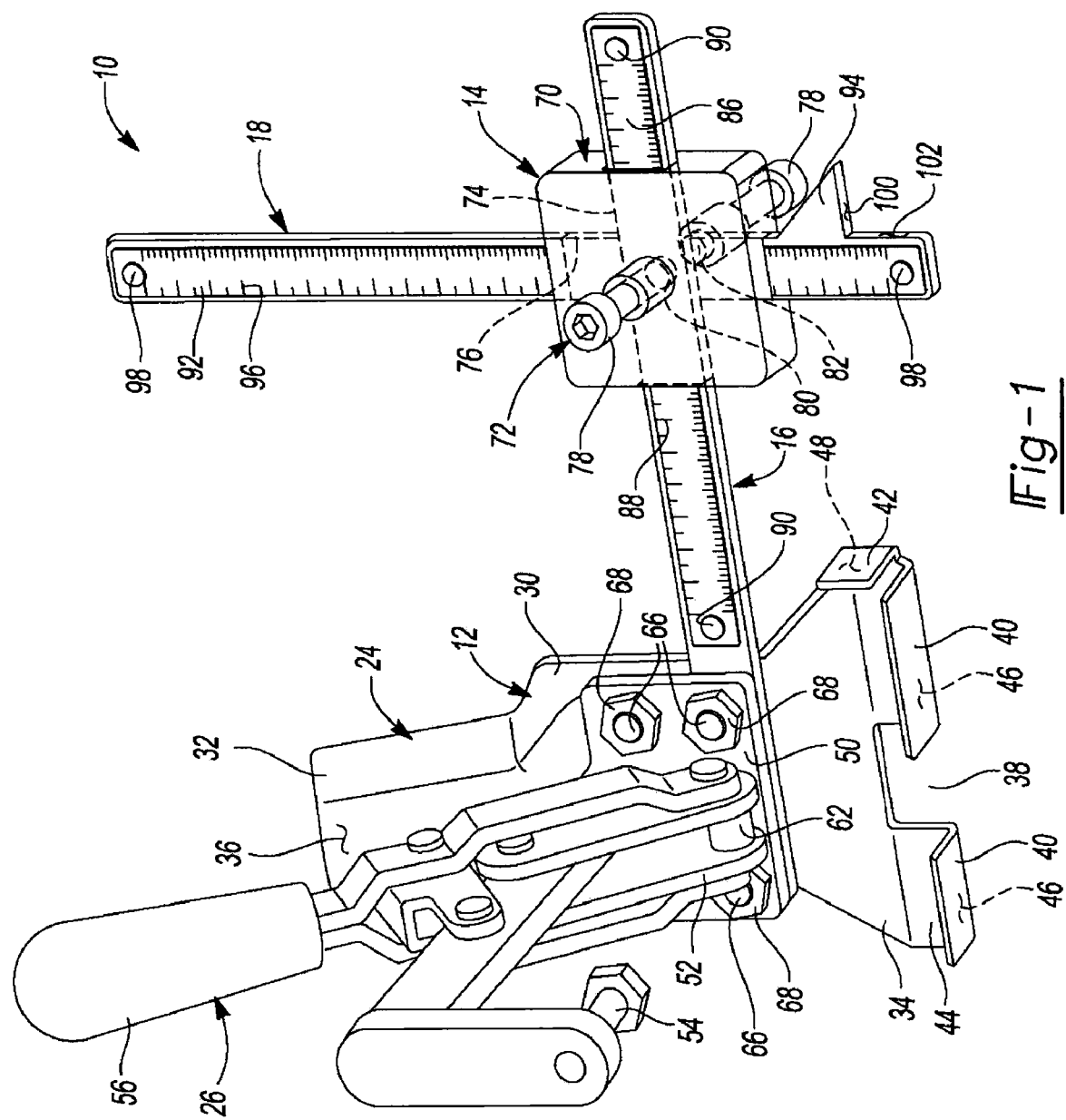
FIG. 1 is a perspective view of a measurement device in accordance with the principles of the present disclosure.
Figure 2:
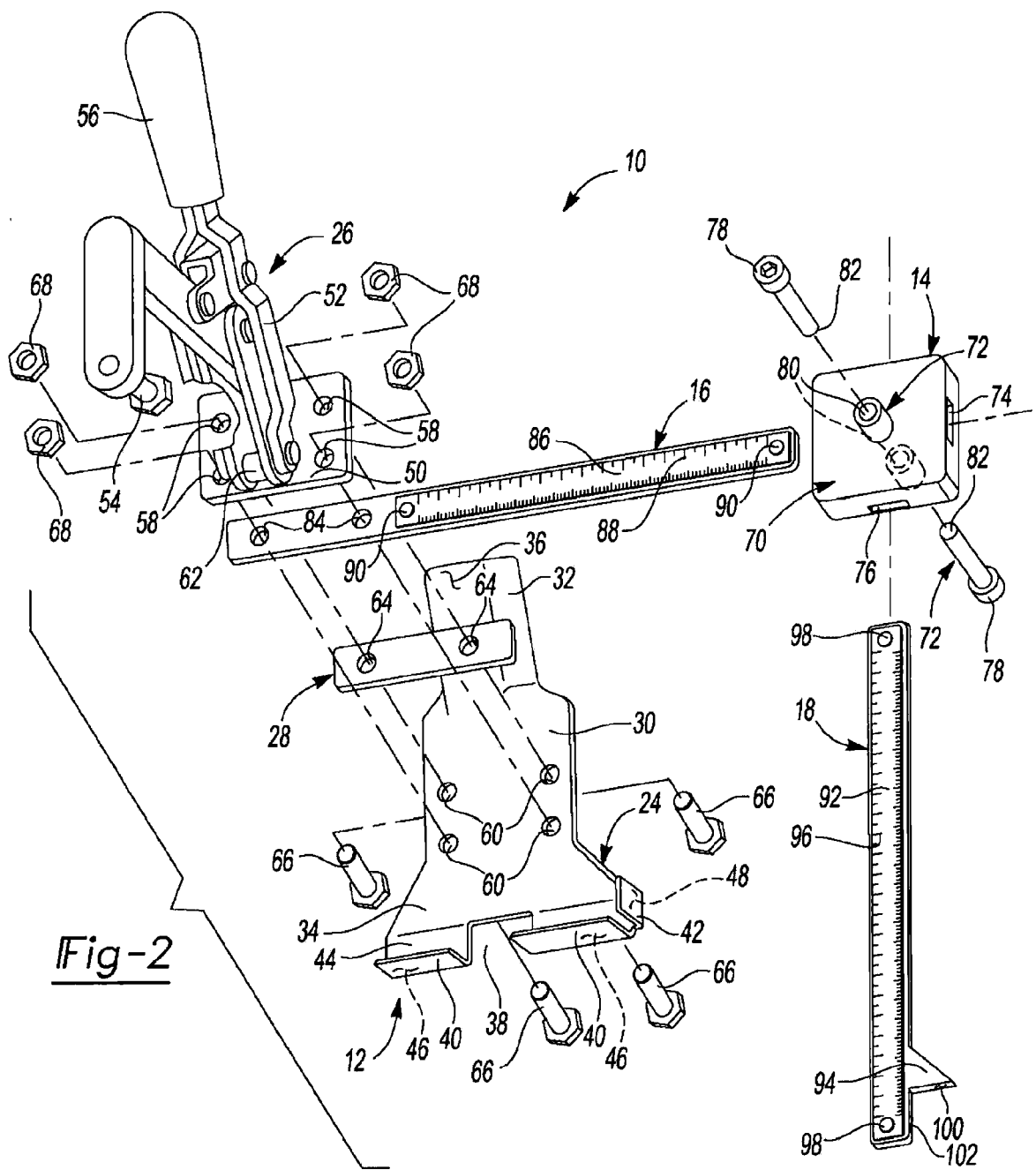
FIG. 2 is an exploded view of the measurement device of FIG. 1.
Figure 3:
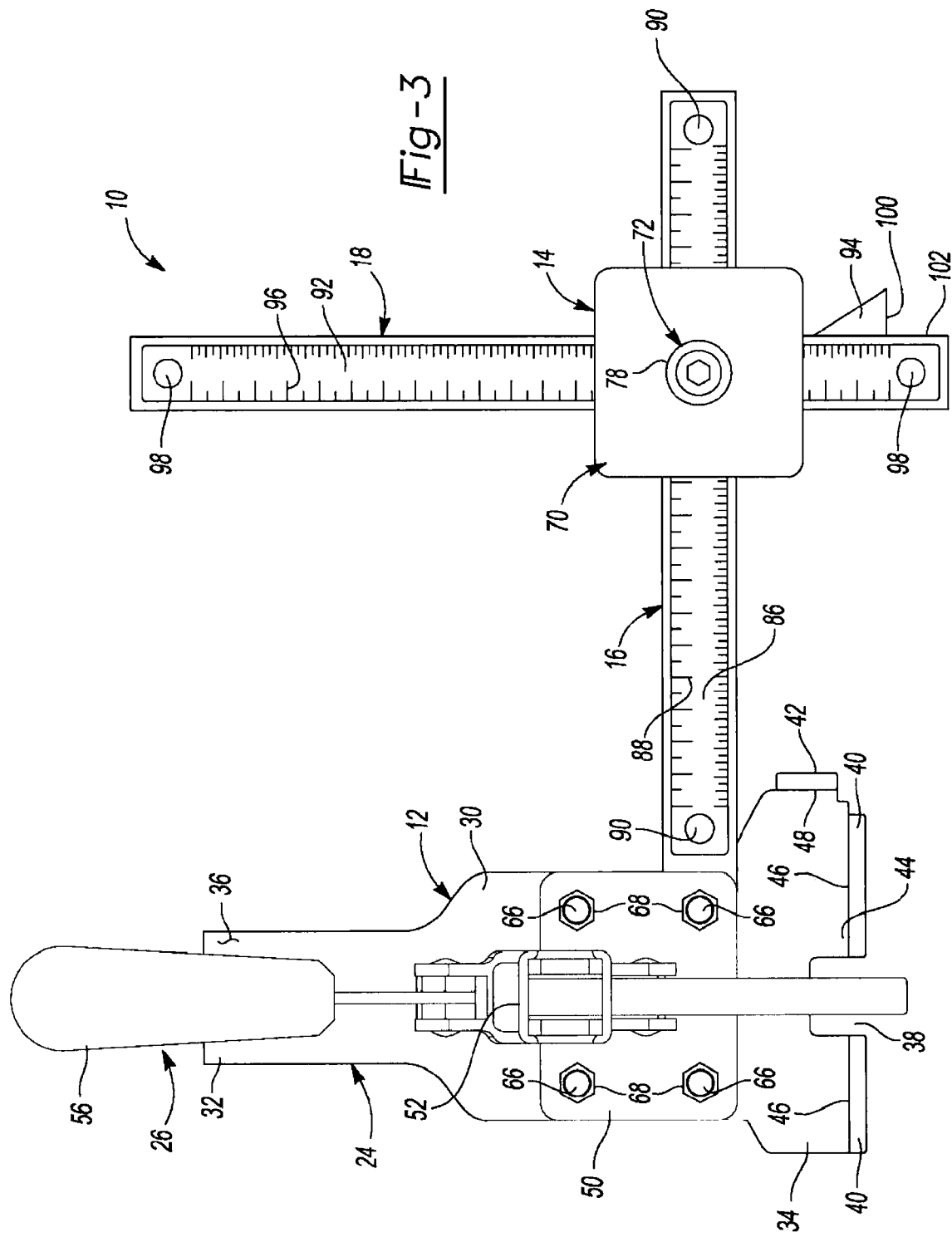
FIG. 3 is a front view of the measurement device of FIG. 1.

The fixture 12 may include a bracket 24, a clamp 26, and a spacer 28. The bracket 24 may include a substantially planar main body 30 having a first flange 32 and a second flange 34 extending therefrom. The first flange 32 may include a substantially arcuate surface 36 and may extend from an opposite end of the main body 30 than the second flange 34. The second flange 34 may include a channel 38 formed between a pair of upwardly extending walls 40 and a sidewall 42 formed substantially ninety degrees(90°) relative to the walls 40. As shown in FIGS. 1 and 2, the walls 40 may cooperate with the sidewall 42 to define a pocket 44 generally between inner surfaces 46 of the walls 40 and an inner surface 48 of the sidewall 42.

The clamp 26 may include an attachment plate 50, a linkage 52, an engagement arm 54, and an actuation handle 56. The attachment plate 50 may include a substantially planar construction to allow for proper alignment of the clamp 26 relative to the main body 30 of the bracket 24 and may include a plurality of apertures 58 formed therethrough. The apertures 58 may include a pattern and spacing substantially equivalent to the pattern and spacing of a plurality of apertures 60 formed through the main body 30 of the bracket 24 to allow the apertures 58 of the attachment plate 50 to properly align with the apertures 60 of the main body 30.

The linkage 52 may extend generally from the attachment plate 50 and may be pivotally attached thereto via a pivot 62. The linkage 52 may cooperate with the engagement arm 54 and the actuation handle 56 such that when a force is applied to the actuation handle 56 to move the actuation handle 56 relative to the attachment plate 50, the engagement arm 54 likewise moves relative to the attachment plate 50. For example, when a force is applied to the actuation handle 56 in a first direction, the engagement arm 54 moves generally toward the second flange 34 of the bracket 24. Conversely, when a force is applied to the actuation handle 56 in an opposite direction than the first direction, the engagement arm 54 moves in a direction substantially away from the second flange 34 of the bracket 24. Movement of the engagement arm 54 towards and away from the second flange 34 of the bracket 24 is accomplished due to interaction of the linkage 52 with the engagement arm 54 and the pivot 62. In one configuration, the clamp 26 may be a DE-STA-CO clamp manufactured by DE-STA-CO Workholding of Auburn Hills, Mich. While the clamp 26 is described as being a DE-STA-CO clamp, the clamp 26 could include any construction that permits the fixture 12 to be selectively and releasably attached to the brake pedal 20.

The spacer 28 may be a substantially flat plate and may include a pair of apertures 64 (FIG. 2). The apertures 64 may be spaced apart approximately the same distance as the apertures 58 of the attachment plate 50 and the apertures 60 of the main body 30 to permit the spacer 28 to be attached to the bracket 24 and the clamp 26. The spacer 28 may include a thickness substantially equal to a thickness of the first bar 16 such that when the first bar 16 is disposed between the attachment plate 50 of the clamp 26 and the main body 30 of the bracket 24, the spacer 28 cooperates with the first bar 16 to provide a substantially flat mounting surface for the attachment plate 50 and the main body 30.

Once the spacer 28 and first bar 16 are disposed generally between the attachment plate 50 and the main body 30, a series of fasteners 66 may be received through the apertures 60 of the bracket 24, through the apertures 64 of the spacer 28, and finally through the apertures 58 of the attachment plate 50 to secure the bracket 24 to the spacer 28 and the clamp 26. A series of nuts 68 may be threadably attached to the respective fasteners 66 to retain the fasteners 66 and restrict relative movement between the bracket 24, the clamp 26, and the spacer 28.

The junction block 14 may include a housing 70 and a locking mechanism 72. The housing 70 may include a first channel 74 slidably receiving the first bar 16 therein and a second channel 76 slidably receiving the second bar 18 therein. The channels 74, 76 may be machined into the housing 70. Alternatively, the housing 70 may be formed from a pair of housing plates (not shown), whereby the individual plates include a pair of crisscrossing grooves that cooperate to form the respective channels 74, 76 once the respective housing plates are attached to one another to form the housing 70. Regardless of the particular construction of the housing 70, the channels 74, 76 may include a substantially rectangular cross section to allow the channel 74 to slidably and respectively receive the first bar 16 and the second bar 18.

The locking mechanism 72 may include a pair of set screws 78 that are respectively received within threaded bores 80 formed in the housing 70. The bores 80 may extend generally into the housing 70 such that the threaded bores 80 are in communication with the channels 74, 76. As such, sufficient rotation of the set screws 78 relative to the housing 70 causes a distal end 82 (FIG. 2) of each set screw 78 to extend into the respective channels 74, 76 and contact respective ones of the first bar 16 and second bar 18. Contact between the distal end 82 of the set screws 78 and the respective bars 16, 18 prevents relative movement between the first bar 16 and the housing 70 and prevents relative movement between the second bar 18 and the housing 70, as will be described in greater detail below.

The first bar 16 may be slidably received within the channel 74 of the housing 70 and may include a pair of attachment apertures 84 (FIG. 2) and a scale 86. The attachment apertures 84 may be spaced apart and separated from one another approximately the same distance as the apertures 60 of the bracket 24 and the apertures 58 of the clamp 26 to allow the fasteners 66 to properly extend through the bracket 24, the first bar 16, and the attachment plate 50 of the clamp 26 to attach the first bar 16 to the fixture 12. The scale 86 may include a series of graduation marks 88 and may be positioned adjacent to the attachment apertures 84 and secured to the first bar 16 via a series of rivets 90.

The second bar 18 may be slidably received within the channel 76 of the housing 70 and may include a scale 92 and a projection 94. The scale 92 may include a series of graduation marks 96 and may be attached to the second bar 18 via a series of rivets 98. The projection 94 may extend from the second bar 18 and may include an engagement surface 100 disposed substantially ninety degrees(90°) relative to an engagement surface 102 of the second bar 18. As will be described in greater detail below, the engagement surfaces 100, 102 may engage different surfaces of the accelerator pedal 22 to position the junction block 14 relative to the accelerator pedal 22 in an effort to determine the relative position of the brake pedal 20 and the accelerator pedal 22.

With particular reference to FIGS. 4-6, operation of the measurement device 10 will be described in detail. The measurement device 10 may be positioned relative to a brake pedal 20 initially such that the brake pedal 20 is received generally within the pocket 44. A force may be applied to the bracket 24 via the first flange 32 to move the bracket 24 relative to the brake pedal 20 until the inner surfaces 46 of the walls 40 and the inner surface 48 of the sidewall 42 contact an outer perimeter surface 104 (FIG. 4) of the brake pedal 20. Positioning the outer perimeter surface 104 into engagement with the inner surfaces 46 of the walls 40 and the inner surface 48 of the sidewall 42 sets the position of the bracket 24 relative to the brake pedal 20. Once the perimeter surface 104 of the brake pedal 20 is in engagement with the inner surfaces 46 of the walls 40 and the inner surface 48 of the sidewall 42, a force may be applied to the actuation handle 56 of the clamp 26 to cause the engagement arm 54 to move generally towards the second flange 34 and engage a rear surface 106 (FIG. 4) of the brake pedal 20. Contact between the engagement arm 54 and the rear surface 106 of the brake pedal 20 essentially clamps the brake pedal 20 between the bracket 24 and the engagement arm 54 and maintains contact between the perimeter surface 104 of the brake pedal 20 and the inner surfaces 46 of the walls 40 and the inner surface 48 of the sidewall 42. At this point, the relative position of the brake pedal 20 and the fixture 12 is fixed and will remain fixed until a force is applied to the actuation handle 56 of the clamp 26 to release the engagement arm 54 from contact with the rear surface 106 of the brake pedal 20.

Once the fixture 12 is attached to the brake pedal 20, a force may be applied to the housing 70 of the junction block 14 to slide the housing 70 along the first bar 16. The housing 70 may be moved relative to and along the first bar 16 until the engagement surface 102 of the second bar 18 contacts a side surface 108 of the accelerator pedal 22. Once the engagement surface 102 of the second bar 18 contacts the side surface 108 of the accelerator pedal 22, one of the set screws 78 may be rotated until the distal end 82 engages the first bar 16 to prevent further movement of the housing 70 along and relative to the first bar 16. Once the set screw 78 contacts the first bar 16, the position of the housing 70 relative to the fixture 12 and, thus, the brake pedal 20 is fixed.

Once the position of the housing 70 is fixed relative to the brake pedal 20, a force may be applied to the second bar 18 to move the second bar 18 within the channel 76 and relative to the housing 70. The second bar 18 will continue to move relative to the housing 70 until the engagement surface 100 of the projection 94 contacts a top surface 110 of the accelerator pedal 22. Once the engagement surface 102 of the projection 94 contacts the top surface 110 of the accelerator pedal 22, the set screw 78 may be rotated until a distal end 82 of the set screw 78 extends into the channel 76 and contacts the second bar 18. Engagement between the distal end 82 of the set screw 78 and the second bar 18 prevents additional movement of the second bar 18 relative to the housing 70.

Engagement of the set screw 78 of the locking mechanism 72 with the first bar 16 and engagement of the other set screw 78 of the locking mechanism 72 and the second bar 18 fixes the position of the housing 70 relative to the brake pedal 20. At this point, the position of the housing 70 relative to the first bar 16 may be determined by identifying the particular graduation mark 88 disposed adjacent to an outer edge of the housing 70. Likewise, a position of the housing 70 relative to the second bar 18 may be determined by identifying a graduation mark 96 of the second bar 18 disposed proximate to an outer edge of the housing 70.

The graduation mark 88 of the first bar 16 identifies a cross-car distance between the housing 70 and the brake pedal 20 while the graduation mark 96 of the second bar 18 identifies a so-called "lift-off" distance between the housing 70 and the brake pedal 20. The position of the housing 70 relative to the first bar 16 is indicative of the distance between the brake pedal 20 and the accelerator pedal 22 in the cross-car direction. The distance between the top surface 110 of the accelerator pedal 22 and the top surface 112 of the brake pedal 20 is determined based on the position of the housing 70 relative to the second bar 18 and is generally referred to as the "lift-off" distance, as this distance represents the distance the brake pedal 20 is not in plane with the accelerator pedal 22 or the amount the user must compenstate (moving up or down) when moving between, for example, the pedal 22 and the accelerator pedal 22.

While the cross-car distance and lift-off distance are described as being determined by observing the position of the housing 70 relative to the scale 86 of the first bar 16 and relative to the scale 92 of the second bar 18, respectively, the position of the housing 70 relative to the first bar 16 and/or the second bar 18 and, thus, the position of the accelerator pedal 22 relative to the brake pedal 20 could alternatively or additionally be displayed on a single (e.g. analog or digital) display 114 or a pair of displays 114, as shown in FIG. 6.

Regardless of whether the housing 70 includes a display 114, once the locking mechanism 72 is in a locked state such that relative movement between the first bar 16 and the housing 70 and between the second bar 18 and the housing 70 is restricted, a force may be applied to the actuation handle 56 to release the engagement arm 54 from contact with the rear surface 106 of the brake pedal 20 to allow the measurement device 10 to be removed from engagement with the brake pedal 20 and the accelerator pedal 22. Provided the locking mechanism 72 remains in the locked state, the position of the housing 70 relative to the first bar 16 and the position of the housing 70 relative to the second bar 18 may be determined by identifying the position of the housing 70 along the scale 86 of the first bar 16 and by identifying the position of the housing 70 along the scale 92 of the second bar 18 once the measurement device 10 is removed from the brake pedal 20. Alternatively, if the housing 70 includes a display 114, the relative position of the first bar 16 and the housing 70 and the relative position of the second bar 18 and the housing 70 may be read via the display 114.

Because the relative position of the first bar 16 and the housing 70 and the relative position of the second bar 18 and the housing 70 was set based on engagement of the surfaces 100, 102 of the second bar 18 and the accelerator pedal 22 while the bracket 24 was fixed to the brake pedal 20, identifying the relative position of the first bar 16 and the housing 70 and the relative position of the second bar 18 and the housing 70 provides the cross-car distance and the lift-off distance of the brake pedal 20 relative to the accelerator pedal 22. These distances may be determined once the measurement device 10 is removed from the brake pedal 20 and the accelerator pedal 22 and therefore provides the user with the ability to easily read the relative position of the first bar 16 and the housing 70 and the relative position of the second bar 18 and the housing 70. Further, because the measurement device 10 locates off of the same surface of the brake pedal 20 (i.e., surface 104) in each vehicle tested, the measurement device provides a reliable and repeatable way of determining the cross-car dimension and lift-off dimension and is therefore useful in comparing these dimensions over a selection of vehicles.

What is claimed is:

1. A measurement device for a vehicle having a first pedal and a second pedal, the measurement device comprising:
    a fixture releasably attached to one of the first pedal and the second pedal;
    a first bar supported by said fixture and extending toward the other of the first pedal and the second pedal;
    a housing slidably attached to said first bar; and
    a second bar slidably attached to said housing and including a first surface operable to engage a first portion of the other of the first pedal and the second pedal and a second surface operable to engage a second portion of said other of the first pedal and the second pedal, said housing identifying the relative position of the first pedal and the second pedal once said first surface is in contact with said first portion and said second surface is in contact with said second portion.

2. The measurement device of claim 1, further comprising a first locking device operable to selectively prevent relative movement between said housing and said first bar in a locked state and a second locking device operable to selectively prevent relative movement between said housing and said second bar in a locked state.

3. The measurement device of claim 2, wherein said first locking device and said second locking device each include a set screw threadably received by said housing and operable to respectively engage said first bar and said second bar in said locked states.

4. The measurement device of claim 1, wherein said first bar includes a measurement scale having a series of graduation marks.

5. The measurement device of claim 4, wherein a position of said housing relative to said graduation marks identifies a dimension between the first pedal and the second pedal when said first surface engages said first portion.

6. The housing of claim 1, wherein said second bar includes a measurement scale having a series of graduation marks.

7. The measurement device of claim 6, wherein a position of said housing relative to said graduation marks identifies a dimension between the first pedal and the second pedal when said second surface engages said second portion.

8. The measurement device of claim 1, wherein said first bar includes a first measurement scale having a first series of graduation marks and said second bar includes a second measurement scale having a second series of graduation marks.

9. The measurement device of claim 8, wherein a position of said housing relative to said first graduation marks identifies a first dimension between the first pedal and the second pedal when said first surface engages said first portion and wherein a position of said housing relative to said second graduation marks identifies a second dimension between the first pedal and the second pedal when said second surface engages said second portion.

10. The measurement device of claim 9, wherein said first dimension is a cross-car distance between the first pedal and the second pedal and said second dimension is a lift-off distance between the first pedal and the second pedal.

11. The measurement device of claim 1, wherein said housing includes at least one display operable to display said relative position.

12. The measurement device of claim 1, wherein said fixture includes a clamp operable to selectively attach said fixture to said one of the first pedal and the second pedal.

13. The measurement device of claim 1, wherein said first portion is formed substantially ninety degrees(90°) relative to said second portion.

14. The measurement device of claim 1, wherein one of said first portion and said second portion includes an engagement surface operable to receive a force to move said other of the first pedal and the second pedal from a first state to a second state.

15. The measurement device of claim 14, wherein the other of said first portion and said second portion is formed substantially ninety degrees(90°) relative to said one of said first portion and said second portion.

16. A method comprising:
  attaching a fixture to a first pedal;
  moving a measurement device along a first bar toward a second pedal until a second bar contacts a first surface of said second pedal;
  moving said second bar relative to said measurement device until said second bar contacts a second surface of said second pedal;
  identifying a first dimension based on a position of said measurement device relative to said first bar; and
  identifying a second dimension based on a position of said measurement device relative to said second bar.

17. The method of claim 16, wherein contacting said second surface of said second pedal includes contacting a surface of said second pedal that is substantially ninety degrees(90°) relative to said first surface.

18. The method of claim 16, wherein identifying said first dimension includes identifying a cross-car distance between said first pedal and said second pedal and identifying said second dimension includes identifying a lift-off distance between said first pedal and said second pedal.

19. The method of claim 16, wherein moving said measurement device along said first bar includes sliding said measurement device along said first bar and wherein moving said second bar relative to said measurement device includes sliding said second bar relative to said measurement device.

20. The method of claim 16, wherein identifying said first dimension and identifying said second dimension includes at least one of identifying a position of said measurement device relative to a scale associate with said first bar, identifying a position of said measurement device relative to a scale associated with said second bar, and reading a display associated with said measurement device.

* * * * *